(12) United States Patent
Bunn, III et al.

(10) Patent No.: US 6,558,278 B2
(45) Date of Patent: May 6, 2003

(54) METHOD OF DYNAMICALLY DETERMINING THE RELATIVE STIFFNESS OF A GOLF SHAFT

(76) Inventors: Julian W. Bunn, III, 2311 Anderson Dr., Raleigh, NC (US) 27606; Alfred L. Wicks, 2308 Capistrano St., Blacksburg, VA (US) 24061

( * ) Notice: Subject to any disclaimer, the term of this patent is extended or adjusted under 35 U.S.C. 154(b) by 102 days.

(21) Appl. No.: 09/735,184

(22) Filed: Dec. 9, 2000

(65) Prior Publication Data

US 2001/0006911 A1 Jul. 5, 2001

Related U.S. Application Data

(63) Continuation-in-part of application No. 09/259,354, filed on Mar. 1, 1999, now Pat. No. 6,328,660.

(51) Int. Cl.⁷ ................................ A63B 57/00
(52) U.S. Cl. ................ 473/409; 73/570; 73/572; 73/579
(58) Field of Search .............. 473/287, 289, 473/292, 409, 257, 316, 323, 282; 73/570, 572, 579

(56) References Cited

U.S. PATENT DOCUMENTS

| | | | | |
|---|---|---|---|---|
| 4,070,022 A | * | 1/1978 | Braly ........................ 273/77 |
| 4,189,144 A | * | 2/1980 | Guzzle et al. ............... 273/77 |
| 4,212,193 A | * | 7/1980 | Turley ......................... 73/65 |
| 4,962,489 A | * | 10/1990 | Medlin et al. ............. 367/32 |
| 5,277,059 A | * | 1/1994 | Chastonay ................. 73/65.03 |
| 5,533,399 A | * | 7/1996 | Gibson et al. ............. 73/579 |
| 5,591,091 A | * | 1/1997 | Hackman ................. 473/289 |
| 5,616,832 A | * | 4/1997 | Nauck .................... 73/65.03 |
| 5,703,294 A | * | 12/1997 | McConnell et al. ........ 73/579 |
| 5,874,676 A | * | 2/1999 | Maki, Jr. ................... 73/579 |
| 5,924,936 A | * | 7/1999 | Penley .................... 473/289 |
| 6,045,457 A | * | 4/2000 | Soong ..................... 473/318 |
| 6,048,276 A | * | 4/2000 | Vandergrift .............. 473/316 |
| 6,149,533 A | * | 11/2000 | Finn ....................... 473/336 |
| 6,183,375 B1 | * | 2/2001 | Weiss ..................... 473/289 |

FOREIGN PATENT DOCUMENTS

JP 62075225 A * 4/1987

* cited by examiner

*Primary Examiner*—Peter Vo
*Assistant Examiner*—Paul D Kim
(74) *Attorney, Agent, or Firm*—Coats & Bennett, P.L.L.C.

(57) ABSTRACT

A method of determining the frequencies of a golf club entails suspending the golf club in a substantial free state and thereafter striking or engaging the golf club to cause the same to vibrate or oscillate. Once the golf club has been excited, the method entails measuring the natural frequencies of the golf club. More particularly, in the substantial free state, the club is suspended by a flexible connector which is secured to the grip end of the club.

19 Claims, 4 Drawing Sheets

US 6,558,278 B2

METHOD OF DYNAMICALLY DETERMINING THE RELATIVE STIFFNESS OF A GOLF SHAFT

CROSS REFERENCE TO RELATED APPLICATION

This is a Continuation-in-Part of U.S. patent application Ser. No. 09/259,354, filed Mar. 1, 1999 now U.S. Pat. No. 6,328,660.

FIELD OF THE INVENTION

The present invention relates to systems and methods for fitting a golfer with one or more golf clubs, and more particularly to a system and method that entails measuring one or more swing characteristics of a golfer and utilizing those swing characteristics to select one or more golf clubs with a natural frequency that is determined to be an optimum frequency for the golfer.

BACKGROUND OF THE INVENTION

For many years now, there have been attempts at fitting a golfer with a golf club or set of golf clubs with the idea that golf clubs of a certain characteristic are more suitable for a particular golfer than others. A number of factors have been considered in fitting a golfer with golf clubs. One factor that has been used and considered in this process is the stiffness of the golf club. It has been recognized that the stiffness of a golf club should vary depending upon a number of factors peculiar to the golfer. For example, it is widely accepted that a more flexible shaft is appropriate for a golfer that generates a relatively low club velocity. By the same token, it is appreciated that a stiffer club would under ordinary conditions be more appropriate for a person that generates a relatively high club velocity.

Even with those guidelines, it has still been difficult for retailers, pro shops, and professionals in the golf industry to appropriately fit golfers with golf clubs. One of the problems has been the lack of any standardization in the industry that scientifically and with precision provides guidance in fitting a golfer with a particular set of golf clubs.

While the stiffness or the flexibility of a golf club is important in the fitting process, the lack of a stiffness or flexibility standardization has hampered professionals from being very effective in fitting golf clubs with precision. For example, in the golf industry the stiffness of the shaft is generally seen as following within one of five categories: extra stiff, stiff, regular, seniors, and ladies. However, these categories do not align or correlate between different manufacturers. That is, a stiff club produced by one manufacturer may be equivalent to a regular club produced by a second manufacturer. Therefore, by simply determining that a "stiff" or "regular" club would be appropriate for a golfer can be rather meaningless.

It is known to utilize scientific principles in the actual manufacturing of golf clubs. In particular, it is known to provide the shafts of golf clubs with various degrees of stiffness based on a range of swing characteristics or conditions. For example, see the disclosures found in U.S. Pat. Nos. 4,122,593; 4,070,022; and 4,736,093.

While there have been attempts at devising systems and processes for fitting a golfer with golf clubs, the past approaches have been imprecise, difficult to effectively use, and in the end, have failed to properly match golfers with golf clubs based on sound rational and scientific principles. Thus, there is and continues to be a need for such a system and process.

SUMMARY OF THE INVENTION

The present invention entails a system and method for fitting a golfer with one or more golf clubs that is based on sound and rational principles. Accordingly, the present invention entails measuring one or more swing characteristics of a golfer and utilizing that measured swing characteristic to arrive at a swing coefficient for the golfer. In one embodiment of the present invention, the swing characteristics measured and analyzed include club velocity and/or club head load which happens to be the load placed on the golf club head at the conclusion of the back swing and just prior to the golfer moving downwardly through his or her swing. The swing coefficients are correlated to a range of golf club natural frequencies and club lengths and weights. Given that a golfer is seeking a club of a particular length, for example an 8-iron or a 9-iron, then by looking at the correlation between swing coefficient and natural frequencies, one can select a golf club with natural frequencies that are deemed appropriate or suitable for the golfer.

Once the natural frequencies have been determined for a particular golf club, then premanufactured clubs can be tested for natural frequencies to determine a specific club that is appropriate for the golfer. In addition, golf clubs can be custom manufactured or retrofitted to yield the ideal or targeted natural frequencies. In any event, the golfer is fitted with one or more golf clubs that yield or possess natural frequencies that correlates to the swing coefficient of a particular golfer for any given club.

It is therefore an object of the present invention to provide a system or method for fitting a golfer with golf clubs that are based on objective standards.

A further object of the present invention is to provide a system and method for fitting a golfer with golf clubs wherein the method or process is based on scientific criteria that identifies golf clubs that are appropriately suited for a specific golfer and which at least approximates an optimum club or set of clubs for the golfer.

Other objects and advantages of the present invention will become apparent and obvious from a study of the following description and the accompanying drawings which are merely illustrative of such invention.

DETAILED DESCRIPTION OF THE INVENTION

Figure 1:
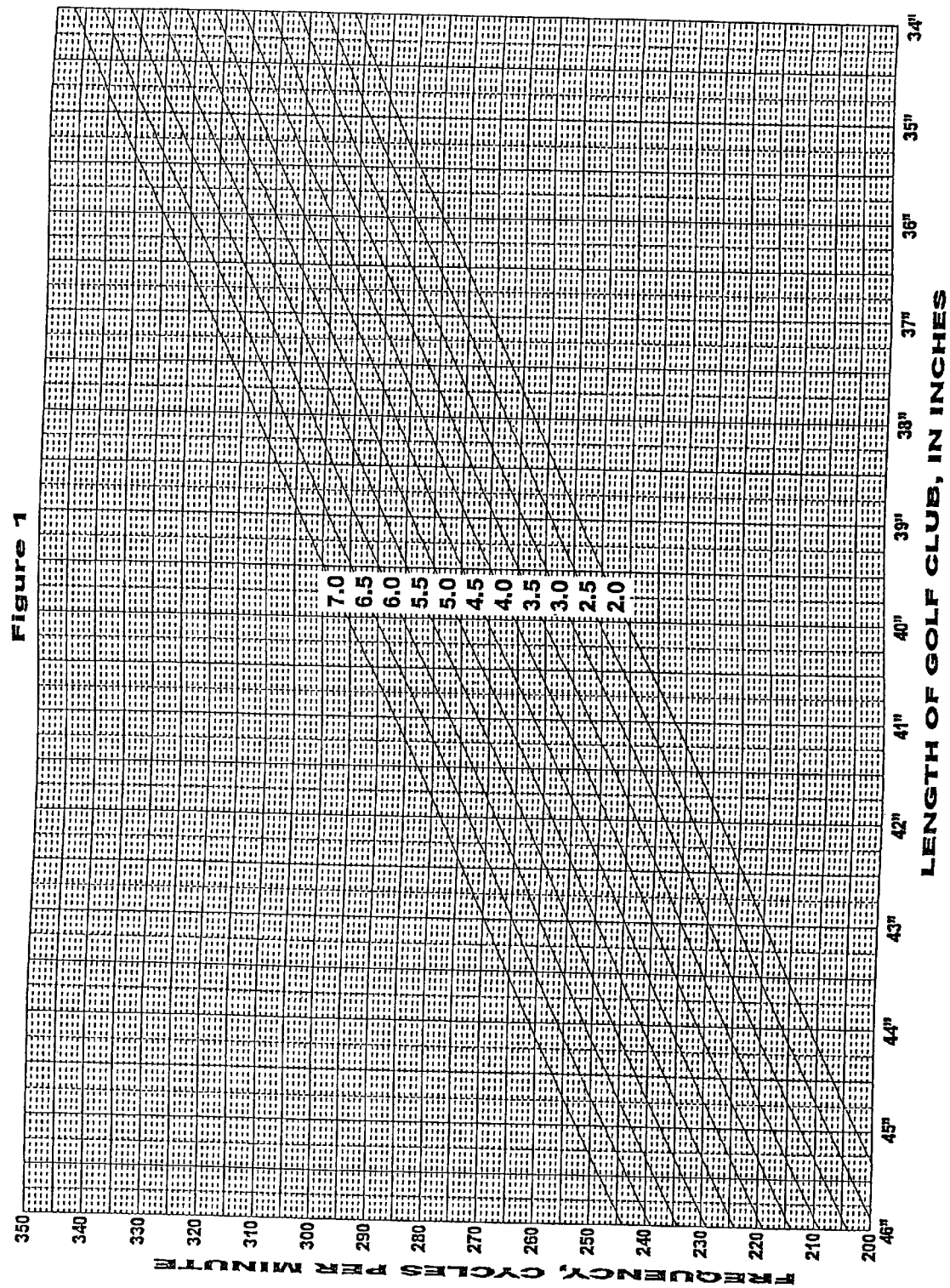
FIG. 1 is a graphic illustration showing swing coefficient as a function of club frequency and club length.

The present invention entails a system and method that permits a golfer to be matched with one or more golf clubs that is compatible with the golfer's swing. More particularly, the present invention entails establishing criteria related to swing characteristics and correlating those swing characteristics to a range of swing coefficients that in the end are used to identify and determine optimal characteristics of a golf club. In the embodiment disclosed herein, two main swing characteristics are utilized: (1) club velocity and (2) club load. Club velocity refers to the velocity of the club just prior to impact during a normal swing. The shaft load characteristic referred to is a measure of the load placed on the shaft at the top of a normal swing just prior to the golfer executing the down swing. Expressed in another way, the load is a measure of the force placed on the shaft at the transition between the back swing and the down swing. Just prior to the golfer executing the down swing, it is common for the shaft to flex and in the course of flexing the load being identified here is placed on the shaft. Other swing characteristics can be employed in order to determine a swing coefficient for a golfer. For example, one other swing characteristic maybe the elapsed time of the swing. That is, the time from the start of the swing to impact is measured. This can be integrated with other swing characteristics such as club velocity and load factor to arrive at a swing coefficient.

There are numerous conventional ways to measure club velocity and club head load which is referred to herein as the load index or load factor. For example, there is available commercially, instrumentation that can be utilized to measure the club velocity of a golf club during the course of a swing. For example, Miya, Inc. produces such an instrument sold under the name "Velocity Meter". In addition, there are devices that can be attached to the club head to measure the load index or load factor described above. One such device is manufactured by True Temper, Inc. and is referred to as the "Determinator".

In table 1 appearing below, the swing characteristics, club velocity and load index or load factor are set forth and are correlated with a range of swing coefficients. Note that the club velocities vary from 60 mph to 125 mph. Also the load index or load factor varies from 4 to 26. In developing this system and process, a range of load factors have been matched with a particular club velocity. This is based on the conclusion that under normal conditions, that for each club velocity or range of velocities there is a general range of loads that are developed by average golfers. Therefore, there is some natural correlation between club velocity and the load factor.

Once the swing characteristics have been grouped, then a range of swing coefficients are uniformly distributed over the range of swing characteristic. The swing coefficients therefore serve to identify a range of swing characteristics that a universe of golfers would inherently possess.

TABLE I

SWING CHARACTERISTIC-SWING COEFFICIENT CORRELATION

| CLUB VEL-OCITY (MPH) | LOAD INDEX | SWING COEFFI-CIENT | CLUB VEL-OCITY (MPH) | LOAD INDEX | SWING COEFFI-CIENT |
|---|---|---|---|---|---|
| 125.0 | 20–26 | 7.0 | 92.5 | 12–18 | 4.5 |
| 123.7 | 20–26 | 6.9 | 91.2 | 12–18 | 4.4 |
| 122.4 | 20–26 | 6.8 | 89.9 | 11–17 | 4.3 |
| 121.1 | 19–25 | 6.7 | 88.6 | 11–17 | 4.2 |
| 199.8 | 19–25 | 6.6 | 87.3 | 11–17 | 4.1 |
| 118.5 | 19–25 | 6.5 | 86.0 | 10–16 | 4.0 |
| 117.2 | 18–24 | 6.4 | 84.7 | 10–16 | 3.9 |
| 115.9 | 18–24 | 6.3 | 83.4 | 10–16 | 3.8 |
| 114.6 | 18–24 | 6.2 | 82.1 | 9–15 | 3.7 |
| 113.3 | 17–23 | 6.1 | 80.8 | 9–15 | 3.6 |
| 112.0 | 17–23 | 6.0 | 79.5 | 9–15 | 3.5 |
| 110.7 | 17–23 | 5.9 | 78.2 | 8–14 | 3.4 |
| 109.4 | 16–22 | 5.8 | 76.9 | 8–14 | 3.3 |
| 108.1 | 16–22 | 5.7 | 75.6 | 8–14 | 3.2 |
| 106.8 | 16–22 | 5.6 | 74.3 | 7–13 | 3.1 |

TABLE I-continued

SWING CHARACTERISTIC-SWING COEFFICIENT CORRELATION

| CLUB VEL-OCITY (MPH) | LOAD INDEX | SWING COEFFI-CIENT | CLUB VEL-OCITY (MPH) | LOAD INDEX | SWING COEFFI-CIENT |
|---|---|---|---|---|---|
| 105.5 | 15–21 | 5.5 | 73.0 | 7–13 | 3.0 |
| 104.2 | 15–21 | 5.4 | 71.7 | 7–13 | 2.9 |
| 102.9 | 15–21 | 5.3 | 70.4 | 6–12 | 2.8 |
| 101.6 | 14–20 | 5.2 | 69.1 | 6–12 | 2.7 |
| 100.3 | 14–20 | 5.1 | 67.8 | 6–12 | 2.6 |
| 99.0 | 14–20 | 5.0 | 66.5 | 5–11 | 2.5 |
| 97.7 | 13–19 | 4.9 | 65.2 | 5–11 | 2.4 |
| 96.4 | 13–19 | 4.8 | 63.9 | 5–11 | 2.3 |
| 95.1 | 13–19 | 4.7 | 62.6 | 4–10 | 2.2 |
| 93.8 | 12–18 | 4.6 | 61.3 | 4–10 | 2.1 |
| 92.5 | 12–18 | 4.5 | 60.0 | 4–10 | 2.0 |

From the above table, it is seen that the swing coefficients range from 2.0 to 7.0. Within that range of swing coefficients, Table I shows club velocity measured at the head, varying from 60 mph to 125 mph while the load index or load factor varies from 4 to 26.

Table I serves as a reference that is used in fitting a golfer with one or more golf clubs. Procedurally, the golfer is examined and evaluated for certain swing characteristics.

In the case of this embodiment, a test is conducted to determine the golfer's normal club velocity. In determining this, it is suggested that the golfer, after appropriately warming up, make five separate swings with a standardized club and in each case, a club velocity reading is taken. These are averaged and the average club velocities are established for the golfer. Next, a load factor test can be is conducted on the golfer. By using a conventional device used to measure load factor, the load or load factor applied to the club just after reaching a full back swing position is determined. Now two swing characteristics of the golfer are known, club velocity and load factor. From this information, one goes to Table I and determines the swing coefficient for that golfer. In the case of Table I, there are intervals between the club velocity readings. Thus, if a golfer's club velocity falls between two readings, which it will from time to time, then the closest club velocity is selected from the reference, which in this case is Table I. Opposite the selected club velocity is a load factor index which comprises a range of load factors. If the golfer's load factor falls squarely within that range, then the corresponding swing coefficient is selected. There are cases where the golfer's load factor will fall outside of the corresponding range. In this case, this means that the swing coefficient must be adjusted up or down. In this embodiment, it is contemplated that the swing coefficient will be adjusted up and down a value of 0.1 for each unit (1) of variance from the noted load factor. Adjustment of the swing coefficient should be limited. In this embodiment of the invention, it is contemplated that swing coefficient will never be adjusted up and down more than 0.4.

To appreciate the calculation of swing coefficient, consider this example. A golfer has an average club velocity of 95.0 mph measured at the head and an average load factor of 22. This would yield a swing coefficient of 5.0. This is because one starts with a swing coefficient of 4.7 and that is adjusted upwardly 0.3 since the load factor 22 exceeds the normal range set forth in Table I by 3 units.

After the swing coefficient for the golfer has been determined, the next step in the procedure entails selecting a golf club or a set of golf clubs that are appropriately matched to the golfer based on his or her swing coefficient. In fitting a club to a golfer, the stiffness or flexibility of the shaft of the golf club is an important consideration. The stiffness or flexibility of a golf club can be viewed in terms of the natural frequencies of the club which is expressed in cycles per minute. Generally, the stiffer the golf shaft, the greater the natural frequency. Therefore, it is contemplated that based on table I and accepted correlations between the stiffness of a golf club and a golfer's ability as reflected by his or her swing characteristics, that a golfer having a greater club velocity and a correlating load factor will generally require a shaft having a larger natural frequencies.

Turning to FIG. 1, there is provided a graphic illustration that correlates the swing coefficients set forth in table 1 with the first flexible natural frequency and length of golf club. Note that for any given length of club, that this natural frequency, cycles per minutes, increases as the swing coefficient increases. Also, as the length of the golf club decreases, the correlated natural frequency for a given swing coefficient increases.

With reference to FIG. 1, assume that the determined swing coefficient for a particular golfer is 5.0. If that golfer desires a 40-inch club then it follows that this matched natural frequency for that particular club is 275 cpm. Consider a swing coefficient of 2.5 and the desire to match a 43-inch club. A 2.5 swing coefficient for a 43-inch club yields a matched natural frequency of 225 cpm. Therefore, it is appreciated that once a golfer's swing coefficient is determined, that by consulting the reference of FIG. 1, the natural frequencies for a variety of clubs can be determined.

Figure 2:
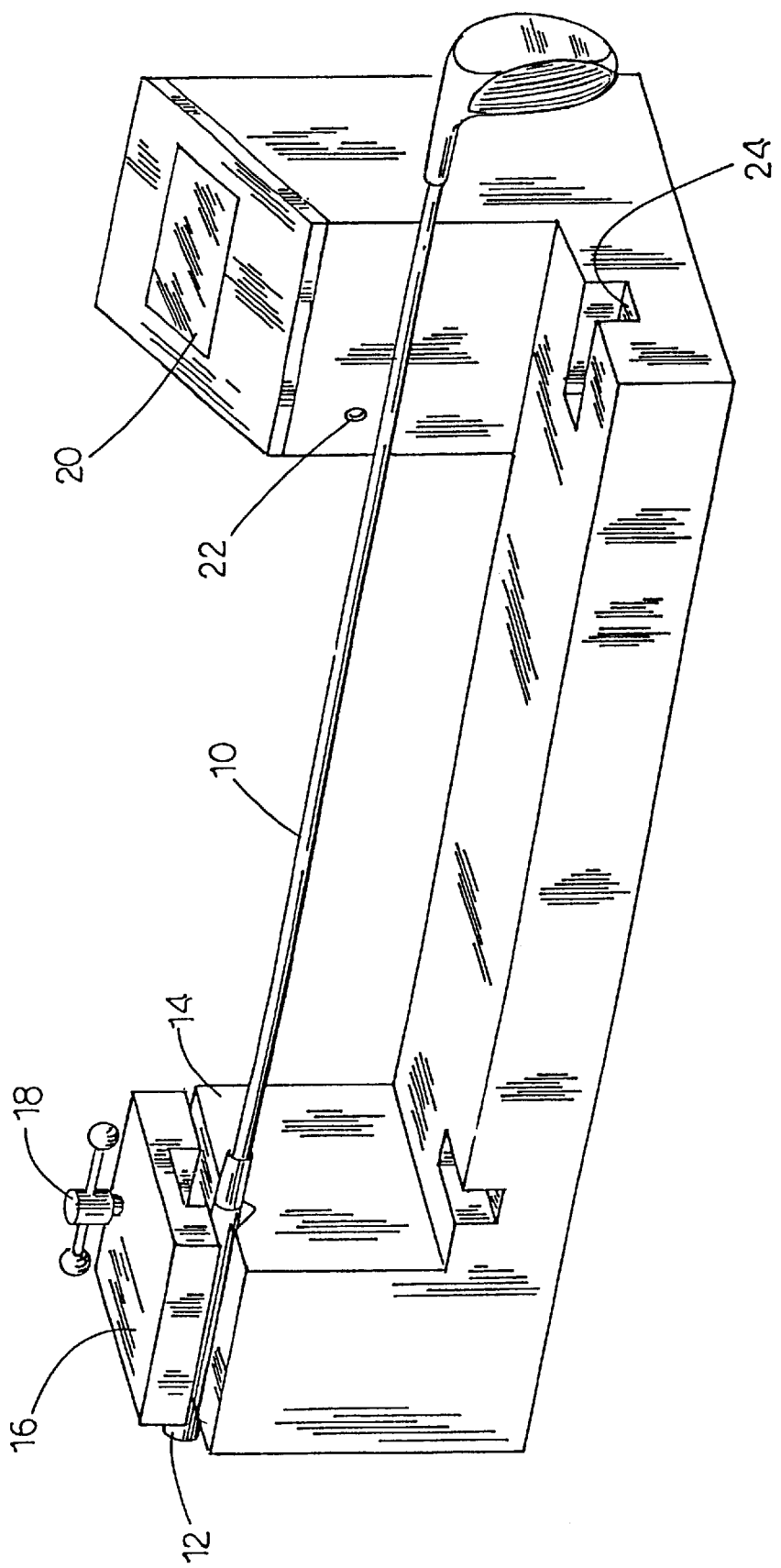
FIG. 2 is a perspective view of a frequency analyzer for determining the natural frequencies of a golf club.

Once the natural frequencies for a particular club or a set of clubs have been determined, then a club or set of clubs can be selected that possess the appropriate natural frequencies determined by this method. In addition, these natural frequencies can be used to custom make one or more golf clubs that precisely yield the appropriate flexibility. In the case of selecting from premanufactured golf clubs, the golfer may select a particular club and that club can be tested for its natural frequency to determine if its flexibility is the same or approximates the matched natural frequency taken from FIG. 1. Devices and instrumentation for measuring the natural frequency of golf clubs are well known and commercial available. For example, a golf club frequency analyzer is shown in FIG. 2. Note that in use, the golf club 10 is supported about its grip end 12 within a notched block 14. A securing plate is secured downwardly over the top of the grip end by an adjustment mechanism 18. This enables the golf club 10 to be supported in cantilever fashion such that the opposite end, the club head end, is free to be deflected and released such that it will cycle back and forth. The frequency analyzer is provided in conventional fashion with some means for measuring or counting the cycles per minute in response to this deflection. In the case of the example shown in FIG. 2, there is provided a light source 22 that is effective to count the cycles per minute (cpm) of the golf club shaft in response to the shaft being deflected and set in motion. This is accomplished by an operator taking his or her finger and deflecting the golf club 10 downwardly until the shaft portion rests in the stop 24 formed in the base of the analyzer. Once the finger is released, the shaft will oscillate up and down and during that process the frequency analyzer will determine the natural frequency (cpm) of this particular golf club. It is through this process that premanufactured clubs are measured for frequency to determine if the actual natural frequency of the selected clubs conform with the natural frequency called for by the swing coefficient of the golfer.

Besides utilizing the present system and method for selecting premanufactured clubs, the natural frequencies that this method yields can also be utilized in the custom manufacture of golf clubs. In a case where a golfer desires a custom set of golf clubs to be manufactured, the natural frequencies for each of the clubs would be determined in the same manner as described above. To achieve a selected set of natural frequencies, it is known that the natural frequencies of a golf club shaft can be varied by selectively trimming one or both ends of the club or changing its weight. Therefore in the case of custom made clubs, the natural frequencies for any particular club can be determined from a reference, in this case FIG. 1, and thereafter one or both ends of the club can be selectively trimmed to yield the desired natural frequencies. It should be pointed out that the procedure for precisely trimming one or both ends of the shaft does take into account the precise weight of the head to applied to that shaft. Thus considering the precise weight and the desired natural frequencies, the golf club can be custom made to yield the natural frequencies called for by the present method. Details of the precise process employed in custom manufacturing golf clubs to exhibit precision natural frequencies is well known and appreciated by those skilled in the art. That process is not per se material to the present invention. The present invention deals with a system and method for determining the optimum natural frequencies for one or more golf clubs based on fundamental swing characteristics.

Method of Dynamically Determining the Relative Stiffness of a Golf Shaft

As discussed above, once a swing coefficient has been determined for a golfer, an appropriate stiffness or natural frequencies for a particular golf club can be determined for that same golfer, based on the determined swing coefficient. Once the relative stiffness has been determined for a particular golf club or a set of golf clubs, then the procedure for fitting the golfer entails testing various golf clubs to determine their relative stiffness or natural frequencies. When the determined relative stiffness or natural frequency of a golf club matches the stiffness or frequencies called for by the golfer's swing coefficient, then an appropriate fit is realized.

In the discussion above, a frequency analyzer such as that shown in FIG. 2, was utilized to test the relative stiffness or natural frequencies of golf clubs. In that process, the handle portion of the golf club was fixed or clamped while the head end portion of the golf club was deflected and released, causing the golf club to oscillate back and forth. During this oscillation, a frequency-measuring device was employed to determine the first bending natural frequency of the golf club.

In many situations this approach to determining the natural frequency of a golf club may be a satisfactory approach to determining the natural frequency of the golf club with a static grip section. However, it is postulated that this approach to determining natural frequencies may not be optimum when one considers the actual swing dynamics experienced by a golf club during the course of a golf swing. In fact, in the case of a normal golf swing there are no static sections found in the golf club as the golf club is powered through its swing. In the case of the swing analyzer shown in FIG. 2, the natural frequencies or relative stiffness of the golf club is determined while the handle portion is fixed or clamped. But, during the course of a golfer's swing, no portion of the golf club is fixed. Indeed, from the start of the down swing through impact with the golf ball, the entire portion of the golf club is free to move and in fact does move. In actual playing conditions, the hands of the golfer add some mass but for the most part during the course of an actual swing, the golf club is maintained in a near-free boundary condition.

In view of the above, the present invention attempts to view and measure the relative stiffness or natural frequencies of a golf club in a dynamic state. That is, the method discussed below aims at determining and measuring the natural frequency of a golf club in an environment or a state that is more representative of the actual dynamics experienced by a golf club during the course of a golfer's swing. Specifically, the present method entails measuring the natural frequencies of the golf club while it is being supported or held in a free—free boundary condition or at least a near free—free boundary condition.

Figure 3:
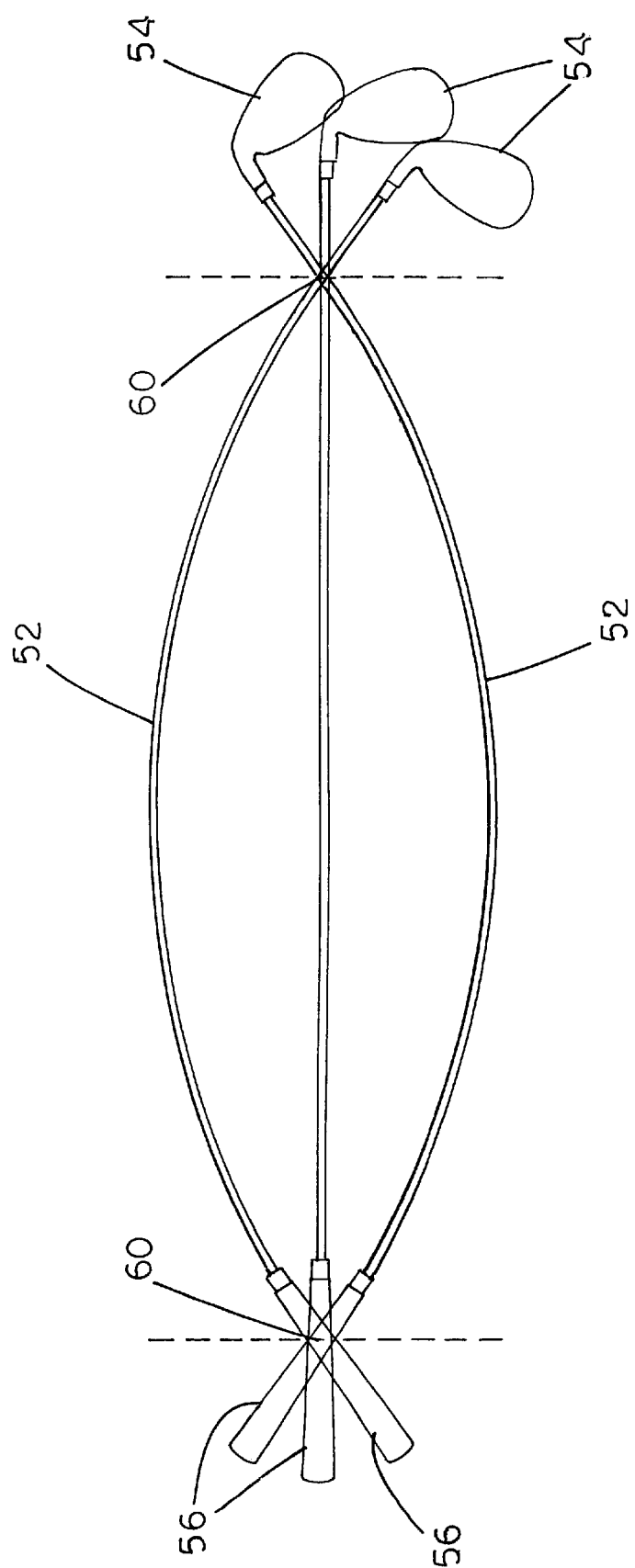
FIG. 3 is an enlarged schematic illustration showing a range of movement for a golf shaft as the shaft flexes or vibrates between two extreme positions.

Before describing this procedure for measuring the natural frequencies of a golf club, reference is made to FIG. 3 of the drawings. Note that this figure is an enlarged schematic illustration showing the deflection or bending of a golf club. It is postulated that for a certain golf club and a certain club velocity, that the golf club, during the course of a swing, deflects or bends about a series of nodes. In the case of the illustration of FIG. 3, the golf shaft deflects back and forth about two nodes, one node in the middle of the grip section and the other node spaced just above the head portion of the golf club. It is postulated that as a golf club is swung, that is moved from a top position downwardly through impact with the golf ball, that the shaft itself oscillates or moves in a manner similar illustrated in FIG. 3. Although the number of nodes may vary, in the case of the illustration of FIG. 3, the shaft itself moves back and forth between extreme positions but that certain portions of the golf shaft remain relatively stationary at the various node points. This is the type of reaction or deflection, and consequently ensuing oscillation that takes place during the course of a golf swing.

The type of oscillation or mode shape that is illustrated in FIG. 3, is thought to take place during the course of a golf swing when the entirety of the golf club is free to move. That is, no portion of the golf club or shaft is held in a fixed position as simulated by the frequency analyzer shown in FIG. 2.

Figure 4:
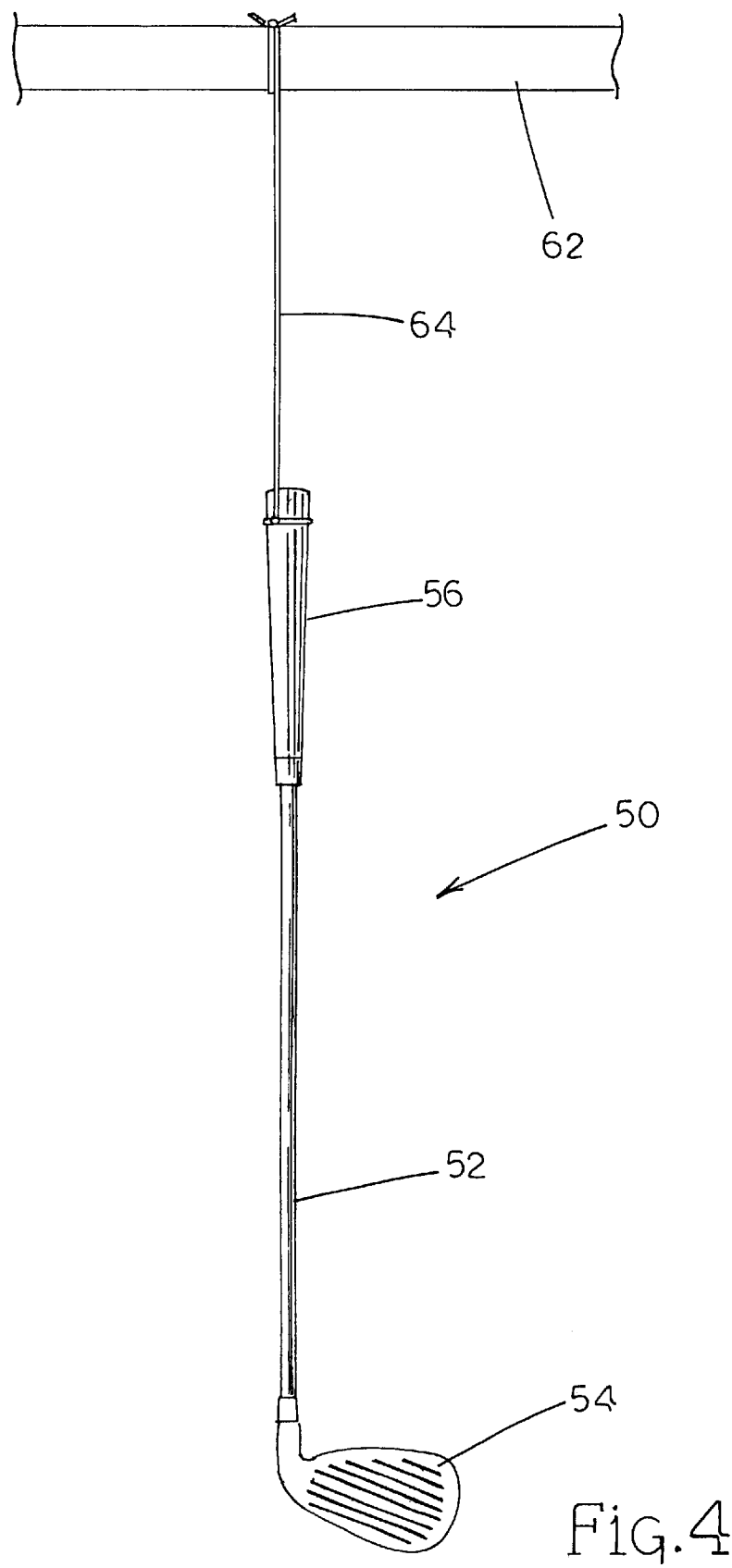
FIG. 4 illustrates a method of suspending a golf club and dynamically determining its natural frequencies.

Turning to FIG. 4, the procedure for determining the relative stiffness or natural frequencies of a golf club are illustrated. This procedure is based on the entire golf club being held in a relatively free—free boundary condition. Here the golf club, indicated generally by the numeral 50, includes a golf shaft 52, a head portion 54, and a grip end portion 56. A flexible connector 64 such as a string or wire is secured to the grip end portion 56 of the golf club and tied to an overhanging support 62. Thus the entire golf club 50 is suspended downwardly from the support 62 by the flexible connector 64. Although the golf club 50 is prevented from moving downwardly, it is otherwise hung or suspended in a relative free state. That is, if the golf club 50 is impacted, then the grip end portion 56 and the head portion 54 as well as the shaft 52 are all free to move. This is to be contrasted with the procedure discussed above wherein the grip end portion of the golf club is fixed while the opposite end portion of the golf club is deflected and released.

To determine the natural frequencies of the golf club suspended in FIG. 4, the golf club 50, after being suspended, is struck by an object. The golf club 50 can be struck at any point except at a node but it is contemplated that the golf club would ordinarily be excited by impacting the shaft 52 at some point between the grip end portion 56 and the head 54. The force of the impact does not have to be great. A simple light stroke with a rod or light hammer is sufficient to excite the golf club. The response of the club is dominated by the response at the natural figures. The force of the impact against the shaft 52 should not affect the ensuing natural frequencies of the golf club 50.

Once the hanging golf club 50 has been excited, its natural frequency can be measured by any number of frequency measuring instruments that are presently used to measure golf shaft frequency, such as load cells, accelerators, and light beams.

Therefore, it is appreciated that the natural frequency of the golf club 50 can be determined while the golf club assumes a substantial free state or free—free boundary condition. This substantial free state tends to more accurately reflect the dynamics experienced by a golf club during the course of a conventional golf swing. Accordingly, the measured natural frequency tends to more accurately reflect the natural frequency exhibited by the golf club during the course of a golf swing. In the end, the golfer is fitted more accurately.

It should be pointed out that the frequencies measured for a golf club that is held in a static mode, such as illustrated in FIG. 2, is different from what one finds when measuring the natural frequencies for a golf club that is suspended, as illustrated in FIG. 4, and sometimes referred to as being suspended in a free—free boundary condition. It would not be surprising for the natural frequencies of a golf club measured in the free—free or suspended state to be on the order of ten times greater than the frequencies measured for the same golf club when at least one portion of the golf club is held in a static position. In other words, the natural frequencies measured in a free—free boundary condition or suspended state may be on the order of one thousand cycles per minute. In any event, this free—free frequencies can be empirically correlated with an array of swing coefficients, such that one or more golf clubs can be appropriately fitted to a particular golfer based on the golfer's swing characteristics and particularly the swing coefficient determined for that golfer.

The present invention provides an effective methodology for fitting individuals by locating the center of gravity of a golf club and by locating the center of percussion of a golf club. In addition, the methodology of the present invention is effective to determine the natural frequency of the golf club, the club weight, and the overall weight distribution of the golf club.

Therefore, it is appreciated that the present application provides a method and procedure for dynamically determining the natural frequencies of a golf club. The measured natural frequencies of the suspended golf club in FIG. 4 is an accurate representation of one of the natural frequencies that will be exhibited by the golf club 50 during the course of a swing. Because of that, the natural frequencies that is indeed determined is a very close approximation of the natural frequencies exhibited by the golf club during the course of a swing.

Herein, club natural frequency(s) refers to the bending and torsional natural frequencies of the system defined by the club and its associated boundary conditions. The boundary conditions may be the golfer, imposing forces and torques to the grip, they may be simulated conditions such as a clamping the grip in a fixture. The bending natural frequencies are assumed to be in orthogonal planes commonly referred to but not restricted to the swing plan and the droop plane. Changes in the flexibility or stiffness of the club shaft can be related to changes in the natural frequencies of the system. However, changes in the mass and mass distribution of the club are also recognized as viable means of changing the natural frequencies of the system.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of determining frequencies of a golf club comprising: suspending the golf club by securing a flexible member to a portion of the golf club such that the golf club is free to move; securing the flexible member above at least a portion of the suspended golf club, striking the golf club and causing the golf club to vibrate; and measuring a frequency of the golf club, and wherein the flexible member has a first portion secured to the suspended golf club and a second portion secured to a support.

2. The method of claim 1, wherein the flexible member is secured at opposite end portions to the suspended golf club and the support.

3. The method of claim 1, wherein engaging the golf club includes striking the golf club while suspended and causing the golf club to vibrate.

4. The method of claim 3, wherein striking the suspended golf club results in the golf club vibrating at its natural frequencies.

5. A method of determining frequencies of a golf club, comprising: disposing the golf club such that the golf club is in a state of free movement; exciting vibrations in the golf club; and, measuring a frequency of the vibrations of the golf club such that the golf club as a whole is in the state of free movement; and wherein the state of free movement is produced by suspending the golf club such that all portions of the golf club are free to move.

6. The method of claim 5, wherein the golf club is excited by striking the golf club with an instrument.

7. The method of claim 5, wherein the state of free movement is achieved by suspending the golf club such that no part of the golf club is fixed against movement.

8. The method of claim 7, wherein the golf club is suspended from a flexible connector that extends between a support and the golf club.

9. The method of claim 8, wherein the flexible connector comprises a flexible tie line that is secured to one portion of the golf club and to the support such that the golf club hangs from the tie line.

10. The method of claim 9, wherein the golf club includes a grip end portion and a head portion, and wherein the tie line is connected to one of the portions of the golf club.

11. A method of fitting a golfer with one or more golf clubs, comprising:

a. measuring one or more swing characteristics of the golfer;

b. based on the one or more swing characteristics, determining a suitable frequency range for one or more golf clubs for the golfer;

c. measuring the frequency of one or more golf clubs to determine if the frequency of the one or more clubs falls within a suitable frequency range;

d. wherein measuring the frequency of the one or more golf clubs includes disposing each club whose frequency is to be measured in a free movement state such that all parts of the golf club are free to move and are not fixed;

e. striking the golf the free movement state and causing the golf club to vibrate; and f. measuring the frequency of the vibrating golf club to determine if the frequency falls within the suitable frequency range.

12. The method of claim 11, wherein measuring the frequencies of the one or more clubs includes suspending each club whose frequencies is to be measured such that no portion of the golf club is fixed, and then exciting the vibration in the golf club.

13. The method of claim 12, including suspending the golf club from a support via a flexible connector.

14. The method of claim 13, wherein the golf club includes a grip-end portion and a head-in portion, and wherein the flexible connector is secured to the grip-end portion of the golf club such that the golf club hangs downwardly from the flexible connector.

15. The method of claim 11 wherein the one or more swing characteristics are taken from the group consisting of club velocity and load index.

16. A method of fitting a golfer with a golf club, comprising: analyzing one or more swing characteristics of a golfer; determining a suitable frequencies for a golf club for the golfer based on the analyzation of the one or more swing characteristics; measuring the frequencies of a golf club to determine if the frequencies of the golf club falls within the suitable frequency range; and, wherein measuring the frequencies of the golf club includes suspending the golf club such that all parts of the golf club are susceptible to movement while being suspended and inducing a vibration within the golf club and measuring the resulting frequencies.

17. The method of claim 16, wherein suspending the golf club includes securing the golf club to a flexible connector and securing the flexible connector to a support such that the golf club hangs from the flexible connector.

18. The method of claim 17, wherein the golf club includes a grip end portion and a head-end portion, and wherein the golf club is suspended by securing the flexible connector to one of the end portions of the golf club and connecting the flexible connector to the support.

19. A method for determining frequencies of a golf club comprising: supporting the golf club in a state of full movement by suspending the golf club through a flexible member; striking the golf club and causing the golf club to vibrate while in the state of free movement; and measuring the frequencies of the golf club.

* * * * *